Figure 3:
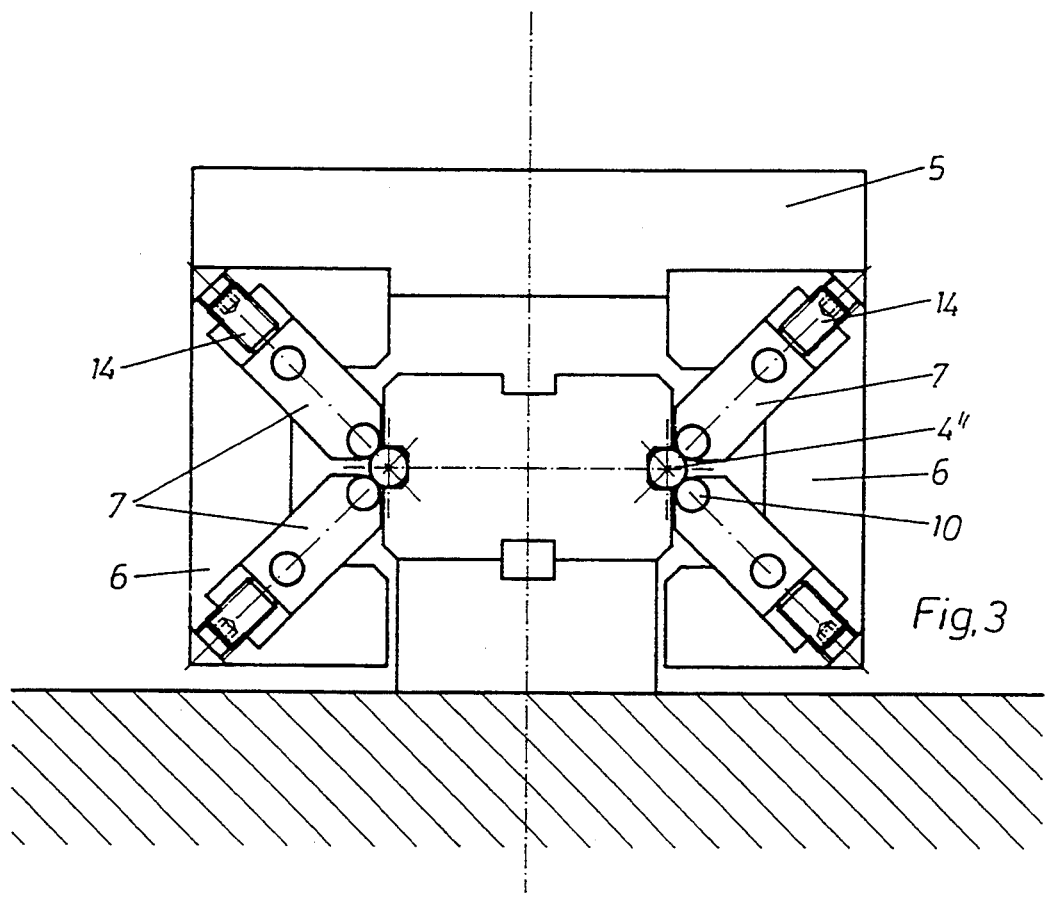

United States Patent [19]

Rixen et al.

[11] Patent Number: 5,439,294
[45] Date of Patent: Aug. 8, 1995

[54] LINEAR GUIDE

[76] Inventors: Wolfgang Rixen; Gerrit Pies, both of Friedenstrasse 107-109, 5650 Solingen 11, Germany

[21] Appl. No.: 86,590

[22] Filed: Jul. 2, 1993

[51] Int. Cl.⁶ .............................................. F16C 29/06
[52] U.S. Cl. ........................................ 384/45; 384/57
[58] Field of Search ................ 384/57, 45, 44, 43, 384/40, 49, 50

[56] References Cited

U.S. PATENT DOCUMENTS

| 2,595,482 | 5/1952 | Palumbo | 384/49 |
| 3,398,999 | 8/1968 | Halvorsen | 384/45 |
| 3,436,132 | 4/1969 | Wiesler | 384/43 |
| 4,553,793 | 11/1985 | Teramachi | 384/45 |
| 4,607,893 | 8/1986 | Damico | 384/45 |
| 4,655,612 | 4/1987 | Lunz et al. | 384/45 |
| 4,895,459 | 1/1990 | Werner | 384/57 X |
| 4,944,608 | 7/1990 | Osawa | 384/57 X |

FOREIGN PATENT DOCUMENTS

| 3040711 | 6/1982 | Germany | 384/40 |
| 190927 | 8/1988 | Japan | 384/50 |
| 131320 | 5/1989 | Japan | 384/50 |
| 2124715 | 2/1984 | United Kingdom | 384/57 |
| 1484990 | 6/1989 | U.S.S.R. | 384/43 |

OTHER PUBLICATIONS

"Roundway Bearings and Ways" Thomson Industries, Inc. pp. 1-20, 1964.

Primary Examiner—Thomas R. Hannon
Attorney, Agent, or Firm—Charles A. Wilkinson

[57] ABSTRACT

A linear guide is provided with two parallel guide rails (4), which are disposed so as to protrude on either side of a rail body (2) and run parallel to one another, and a carriage (5), which is longitudinally displaceable on the guide rails (4) and is supported in double-track fashion at two different places on the periphery of each guide rail (4) by, in each case, two linear ball bearings (7) placed in lateral supporting side walls (6) of the carriage (5) embracing the guide rails (4).

In order to achieve an even simpler and more precise, tolerance-free adjustment of the linear ball bearing and also to be able to adapt these to guide rails of different diameters and, in addition, also to be able to compensate for any angular errors between the guide rails (4) and the guiding carriage (5) rolling on them, each linear ball bearing (7) is adjustably supported individually for itself in the supporting side walls (6) of the carriage (5) transversely and, in particular, radially to the associated guide rail (4). Advantageously, the two linear ball bearings (7), which are placed in each case in a supporting side wall (6) of the guiding carriage (5), can be adjusted at right angles to one another and at an angle of essentially 45° to the center plane (4') passing through the two guide rails (4).

17 Claims, 3 Drawing Sheets

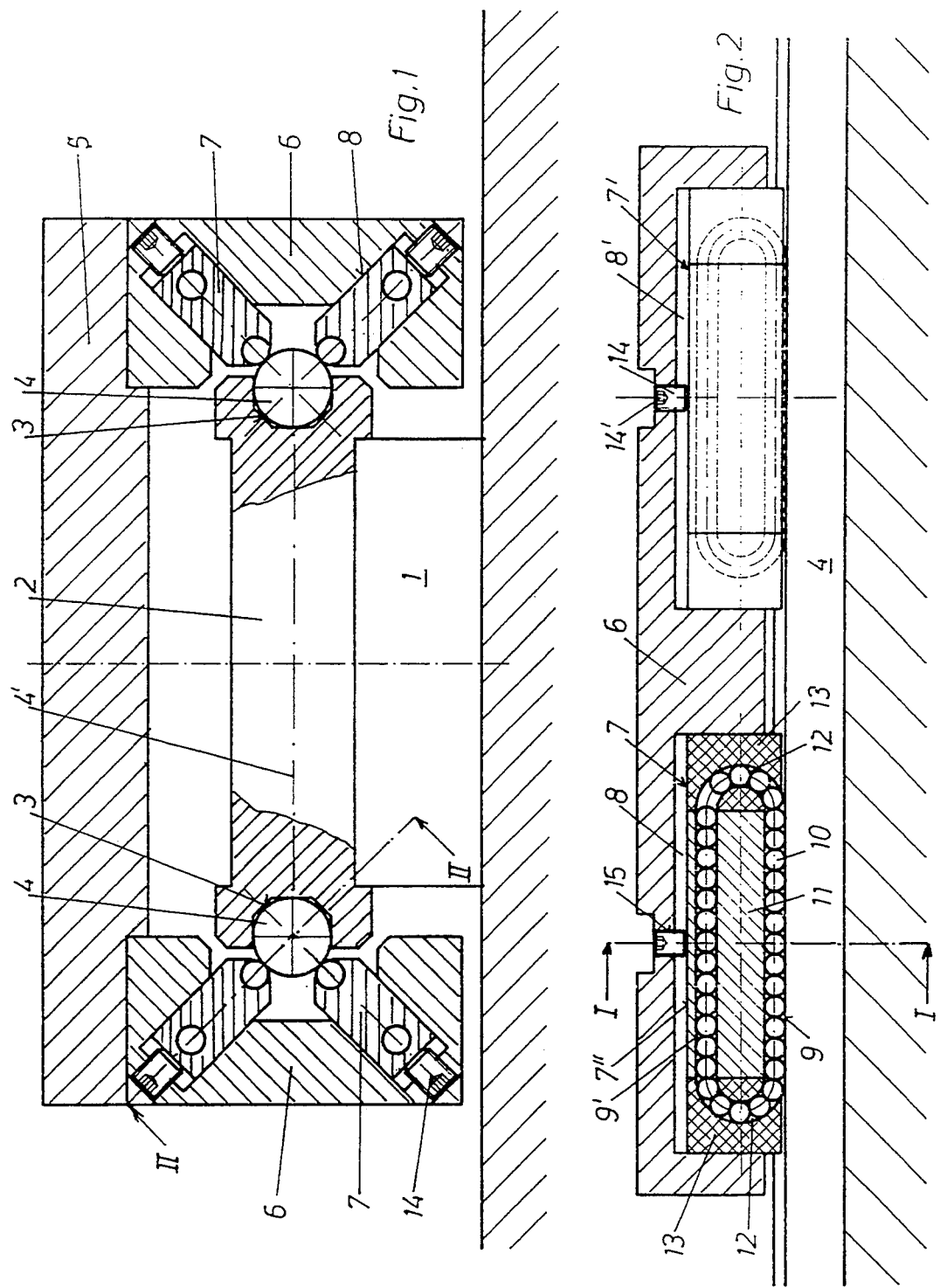

LINEAR GUIDE

The invention relates to a linear guide with two parallel guide rails, which are disposed so as to protrude on either side of a rail body and run parallel to one another, and a carriage, which is longitudinally displaceable on the guide rails and is supported in double-track fashion at two different places on the periphery of each guide rail by, in each case, two linear ball bearings placed in lateral supporting side walls of the carriage embracing the guide rails.

Linear guides of the above type are known, for example, from the EP-C-0 080 515 or the EP-C-0 245 656. They are intended to make accurate longitudinal displacements possible of machining tools and similar working media, which are mounted on the guiding carriage. Such accurate movements are required in different fields, such as fine mechanics, and also for machining thin plates, for example, in the electronics industry. For the known linear guides, the linear ball bearings are disposed in stationary fashion in the supporting side walls of the guiding carriage. They are intended to be able to roll along guide rails of fixed diameter with as little play as possible. This is, however, not always necessarily the case, if for no other reasons than tolerances. The two linear ball bearings in each supporting side wall of the guiding carriage have circulating ball rows, which lie parallel to one another and which, in turn, require guide rails that are closely adapted to them in diameter. A certain, tolerance-free adjustment between the individual guide rail and the two circulating ball rows of each supporting wall assigned to them is possible owing to the fact that, on the one hand, the mutual distance between the guide rails can be varied by adapters that can be placed between them and, on the other, both circulating ball rows can be shifted to a limited extent by excentrically adjusting their rounded supporting bearing lying between them jointly relative to the associated guide rail.

As opposed to this, it is an object of the invention to improve and perfect a linear guide of the initially mentioned type in such a manner, that it permits an even simpler and more precise, tolerance-free adjustment of the linear ball bearing and also its adaptation to guide rails of different diameters and, in addition, also enables any angular errors to be compensated for between the guide rails and the guiding carriage rolling on them. Starting out from a linear guide of the initially mentioned type, this objective is accomplished pursuant to the invention owing to the fact that each linear ball bearing is adjustably supported individually for itself in the supporting side walls of the carriage transversely and, in particular, radially to the associated guide rail. Due to this possibility of being able to adjust each of the two linear ball bearings located in a supporting side wall of the guiding carriage mutually independently, tolerance-free guidance between the guiding carriage and guide rails can be achieved. Moreover, extensive adaptation of the linear ball bearing to guide rails of very different diameters is possible, without having to move away from their most advantageous ball-supporting places at the periphery of the guide rails. In particular, this is not necessary if, as furthermore provided by the invention, the two linear ball bearings, which are placed in each case in a supporting side wall of the guiding carriage, can be adjusted at right angles to one another and at an angle of essentially 45° to the center plane passing through the two guide rails. Finally, a further significant advantage of the inventive linear guide consists therein that errors of tilt, which occur, for example, if the rail body and the two guide rails on either side of it are mounted obliquely, can readily be compensated for by the appropriate, individual adjustment of the linear ball bearings. In these cases also, therefore, an exactly horizontal position of the guiding carriage can be achieved.

Advantageously, each linear ball bearing consists of an essentially cuboid ball circulating body, which contains a ball circulating row longitudinally and centrally and which is guided so that it can slide all around in an accommodating slot of the supporting side wall, the accommodating slot being open towards the associated guide rail. For this, the supporting side walls, disposed on both sides below the guiding carriage, advisably have a U-shaped profile, which is open towards the associated guide rail, the two ball circulating bodies and the accommodating slots containing them being disposed in the inner corners of the supporting side wall profile in miter cut fashion. This results in a simple precisely aligned arrangement of the two ball circulating bodies, which are adjustable at right angles to one another and radially to the associated guide rail.

The ball circulating bodies can consist of a metallic center part containing a linear ball race, which is open towards the inside and closed towards the outside and of two end parts of, in particular, plastic, which close off the middle part at both ends and each of which contains a ball reversing track.

The ball circulating bodies can be adjusted by different means. Such an adjustment is particularly simple if it is carried out by means of one or several regulating screws, which are seated in threaded boreholes located in the outer corners of the supporting sidewalls of the guiding carriage and engage the back of the metallic center part of the ball circulating body. Because they are disposed at the outer corners of the supporting side walls of the guiding carriage, the regulating screws are conveniently accessible from the outside. To be able to adjust the ball circulating bodies, it is sufficient if these can be shifted or adjusted simply more or less far by the regulating screws relative to the guide rails. Furthermore, the regulating screws can also be supported in ball circulating bodies so that said screws can be rotated but not shifted axially with the result that, after each rotational movement, they permit the ball circulating body to be shifted necessarily into the one as well as the other direction.

The guide rails usually have a circular profile, as is also generally the case with conventional linear guides. It is, however, also entirely possible to use guide rails with a polyhedral and, in particular, a hexagonal profile for the present linear guide. In such a case, however, the intersection of the two adjusting directions of the two ball circulating bodies, which belong to a supporting side wall, does not coincide with the center line of the polyhedral profile; instead, it is displaced correspondingly towards the outside.

For special application purposes, for which, particularly, the erosion of larger forces also matters, the invention furthermore provides that two rail bodies, disposed on edge on either side of the head of a T-shaped, profiled supporting structure with two guide rails attached to the top and two to the bottom thereto, be present and that two appropriately disposed upper and lower supporting side walls, each with two ball circulating bodies adjustably supported within them, be present on either side of the guiding carriage. Moreover, the lower supporting side walls can be disposed at the lower ends of side walls mounted on either side of the guiding carriage.

Figure 4:
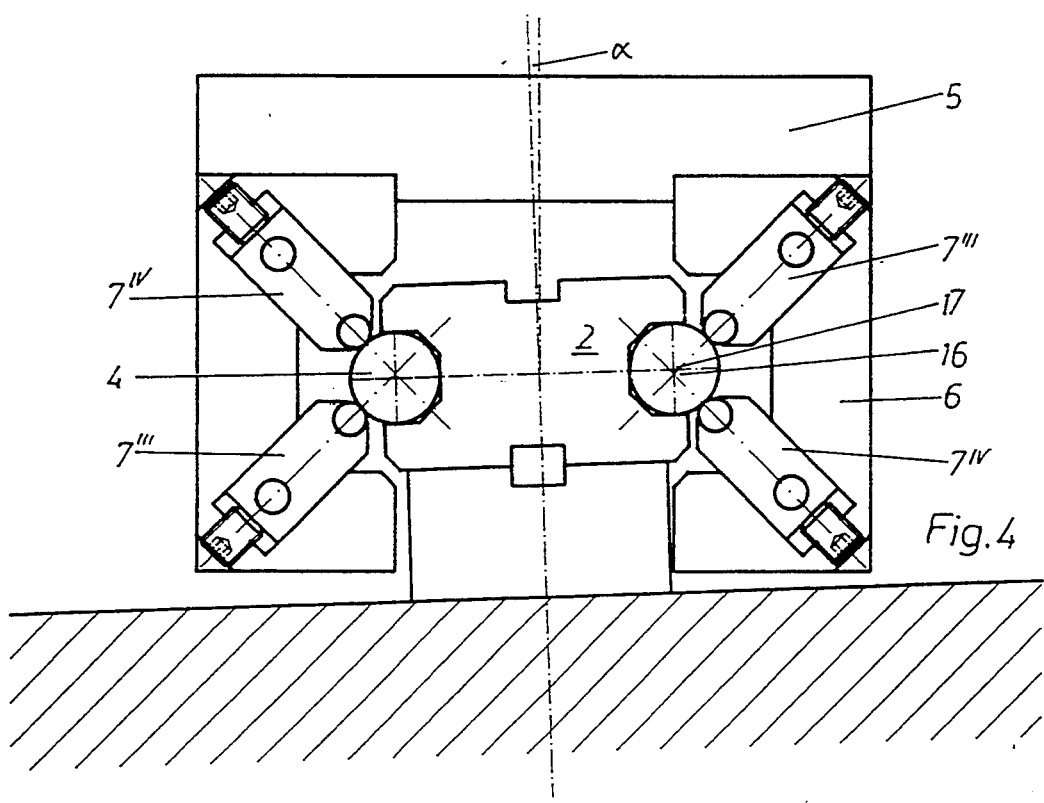
Figure 5:
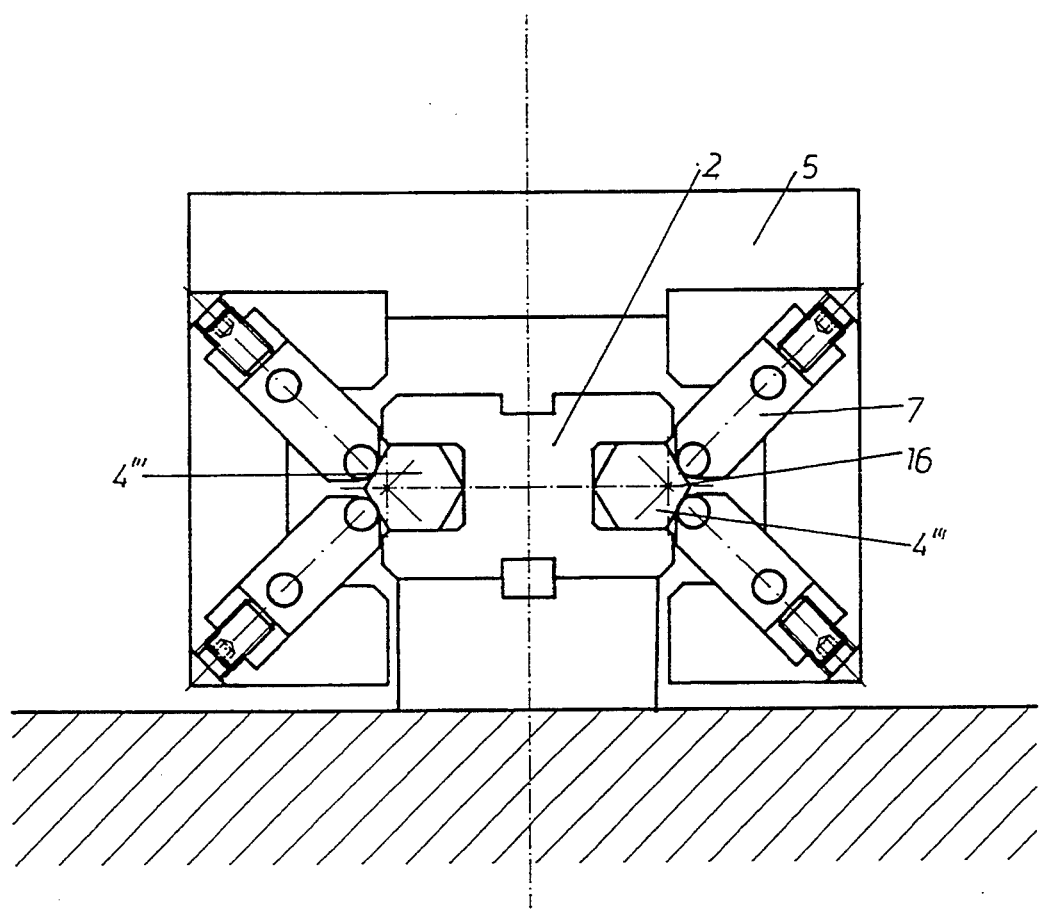
Figure 6:
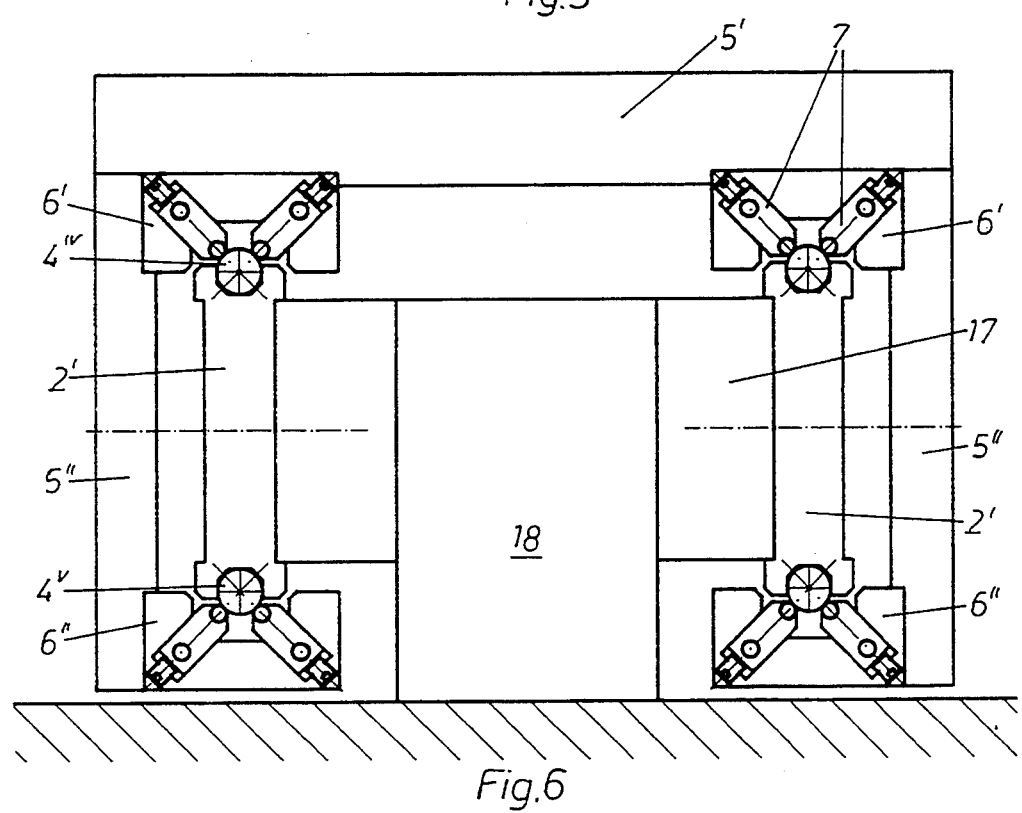

Several embodiments and application examples of the inventively configured linear guides are reproduced in the drawing; for the sake of simplicity, they are shown predominantly diagrammatically. In the drawing, FIG. 1 shows a first embodiment in front view and in partial section along the line I—I of FIG. 2 which shows a section through a supporting side wall with ball circulating bodies corresponding to the line II—II of FIG. 1, FIG. 3 shows an embodiment corresponding to FIG. 1, however, with guide rails that are significantly smaller in diameter, FIG. 4 shows the front view of the linear guide with an inclined position existing between the guiding carriage and the guide rails, FIG. 5 shows an embodiment with hexagonally profiled guide rails and FIG. 6 shows a linear guide with a total of four guide rails and the associated number of individually adjustable ball circulating bodies.

The linear guide, shown in FIGS. 1 and 2, has a rail body 2, which is rigidly disposed on a supporting base 1. On either side of the rail body 2 in each of appropriate longitudinal recesses 3, a guide rail 4 is fastened so that it projects with almost half of its periphery out of the rail body 2. The guide rails 4 have a circular profile and consist, preferably of steel, while the rail body 2 can consist of aluminum.

The guiding carriage 5, which preferably also consists of aluminum, is mounted so that it can be shifted longitudinally on two guide rails 4. For this purpose, it has two supporting side walls 6, which are fastened on either side below it and in each of which there are two ball circulating bodies 7, which lie on the associated guide rail 4 at certain places on the periphery of said guide rails. Advisably, the supporting side walls 6 have the U-shaped profile shown, which is open towards the guide rails 4. Miter cut-type accommodating slots 8, each for a ball circulating body 7 guided therein so that it can be shifted by sliding all around, are present in the inner corners of the supporting side walls 6. As shown in FIG. 2, two ball circulating bodies 7, 7' and the accommodating slots 8 and 8' containing them are disposed coaxially, one behind the other, in each supporting side wall 6, so that each supporting side wall 6 contains a total of four such ball circulating bodies 7 or 7'. This contributes to the jamming-free guidance of the carriage 5, particularly in the case of such larger longitudinal dimensions. For shorter carriages 5, one ball circulating body 7 in the longitudinal direction can basically also already be sufficient.

As again shown by FIG. 2, each ball circulating body 7 advantageously consists of an inwardly open and outwardly closed linear race 9 or 9' for the metallic center part 11 containing the ball circulating row 10 and two plastic end parts 13, which close off said metallic center part 11 at each end and each of which contains a ball reversing track 12.

For the individual adjustment of each essentially cuboid ball circulating body 7 in the accommodating slots 8 of the supporting side walls 6, there is an adjusting screw 14, which is optionally provided with a polyhedral recess 14'. Said adjusting screw 14 is accessible from the outside, seated in a threaded borehole 15 of the supporting side wall 6 and can be pressed against the back 7" of the metallic center part 11 of the ball circulating body 7 or 7'.

As shown by FIG. 1, the two ball-circulating bodies 7 present in each supporting side wall 6 and, of course, also the ball circulating bodies 7' lying coaxially with them are adjustable at right angles to one another and at an angle of inclination of essentially 45° to the center plane 4' passing through the two guide rails 4. Due to the fact that the ball circulating bodies 7 can be adjusted independently of one another, the carriage 5 can be guided on the rails 4 largely without play. Moreover, with the same ball circulating bodies 7, it is also possible to achieve an adaptation to guide rails 4" of a different, for example, smaller diameter, as shown in FIG. 3. For this, it is essential that the ball circulating bodies 7 lie with their ball row 10 on the same, mutually offset by 90° to one another, circumferential places of the associated guide rails 4" and, in this respect, still make possible an accurate satisfactory guidance of the carriage 5 without lift-off and without twisting. In order to achieve this adaptation, only an appropriate further screwing in of the adjusting screws 14 with an appropriate further sliding adjustment of the ball circulating body 7 is necessary.

FIG. 4 shows how an accurately, horizontally aligned position of the carriage 5 is nevertheless obtained in the case of an inclined base or rail body 2 by appropriately differently adjusting the diagonally opposite ball circulating body 7''' and $7^{IV}$. In this case, the carriage 5 thus is inclined at a corresponding angle a to the rail body 2 and to the guide rails 4 of the rail body 2. It is self-evident that, in this case, the adjusting direction intersections 16 of the two ball circulating bodies 7''', $7^{IV}$ of a supporting side wall 6 cannot coincide with the middle longitudinal axis 17 of the guide rail 4, but deviate from this correspondingly.

FIG. 5 shows a linear guide in a diagrammatic front view, which deviates from those previously described only to the extent that the two guide rails 4''', disposed to project on either side of the rail body 2 have a polygonal profile, namely, a hexagonal profile. In this case also, a corresponding tolerance-free as well as inclination-free adjustment is possible due to the individual or circulating bodies 7. However, due to the fact that the adjusting direction intersections 16 of the adjusting movements of each supporting side wall ball circulating pair 7 are moved further to the outside, the adaptation to different guide rail diameters is restricted within narrower boundaries.

For the embodiment shown in FIG. 6, rail bodies 2' disposed on edge, which are provided in each case at the top and at the bottom with a guide rail $4^{IV}$ and $4^V$ fastened thereto so as to project, are disposed on either side of the head 17 of a T-shaped profiled supporting structure 18. Accordingly, the guiding carriage 5' here has at each of its two sides two appropriately disposed, upper and lower supporting side walls 6 and 6', in each of which two ball circulating bodies 7 are supported adjustably. To hold the lower supporting side walls 6", appropriately deep side walls 5" are mounted on either side of the guiding carriage 5'. The supporting side wall 6", with the ball circulating bodies 7 lying therein, are accommodated at the lower ends of said side walls 6".

We claim:

1. A linear guide with two parallel guide rails, disposed so as to extend on either side of a rail supporting body parallel to one another, and a carriage, which is longitudinally displaceable on the guide rails and is supported in a double-track arrangement at two different places on the periphery of each guide rail by, in each case, two linear circulating ball bearing assemblies mounted in lateral supporting side walls of the carriage embracing the guide rails, characterized in that each linear circulating ball bearing assembly is adjustably supported individually in a supporting side wall of the carriage substantially radial to the associated guide rail and in that the two linear circulating ball bearing assemblies which are mounted in each case-in the supporting side wall of the carriage, are disposed at right angles to one another and at an angle of essentially 45° to a center plane passing through the two guide rails.

2. The linear guide of claim 1, characterized in that each linear circulating ball bearing assembly consists of an essentially cuboid circulating body, which contains a ball circulating row longitudinally and centrally and which is guided so that it can freely slide in an accommodating slot of the supporting side wall of the carriage, the accommodating slot being open towards the associated guide rail.

3. The linear guide of claim 2, characterized in that the supporting side walls, disposed on both sides below the carriage, have a U-shaped profile, which is open towards the associated guide rail, the two linear ball circulating bodies and the accommodating slots containing them being disposed in the inner corners of the supporting side wall profile.

4. The linear guide of claim 2, characterized in that the circulating ball bodies consist of a metallic center part containing a linear ball race, which is open towards the inside and closed towards the outside, and two end parts of plastic, which close off a middle part at both ends and each of which contains a ball reversing track.

5. The linear guide of claim 4, characterized in that the adjustment of each ball circulating body is carried out by means of regulating adjustment screws, seated in threaded boreholes located in the outer corners of the supporting side walls of the guiding carriage and engage the back of the metallic center part of the circulating ball body.

6. The linear guide of one of the claims 1 and 2 to 5, characterized in that the two parallel guide rails each have a circular profile.

7. The linear guide of one of the claims 1, and 2 to 5, characterized in that the guide rails have a polygonal profile.

8. The linear guide of one of the claims 1, and 2 to 5 characterized in that two rail bodies, disposed on edge on either side of the head of a T-shaped, profiled supporting structure with guide rails attached to the top and to the bottom thereto, are provided and the two appropriately disposed upper and lower supporting side walls, each with two ball circulating bodies adjustably supported within them, are present on either side of the guiding carriage.

9. The linear guide of claim 8, characterized in that the lower supporting side walls are disposed at the lower ends of side walls mounted on either side of the guiding carriage.

10. A linear guide assembly for movably mounting a carriage comprising:
   (a) a rail support means,
   (b) at least two parallel guide rails securely supported upon said rail support means,
   (c) a carriage arranged and constructed for movably mounting upon and guided movement along said guide rails,
   (d) multiple extended linear rolling contact friction reducing means interposed between said carriage and the adjacent parallel guide rails,
   (e) each of said extended rolling contact friction reducing means being adjustably mounted upon the carriage for adjustment toward and away from said adjacent rail surface, and
   (f) wherein the multiple extended linear rolling contact friction reducing means are oriented substantially at right angles to each other and substantially at a forty-five degree angle with respect to a center plane bisecting the parallel rails.

11. A linear guide assembly for movably mounting a carriage in accordance with claim 10 wherein the multiple extended linear rolling contact means is disposed within a slot in the carriage oriented substantially perpendicular to the rail surface.

12. A linear guide assembly for movably mounting a carriage in accordance with claim 10 wherein adjustment of the multiple extended linear rolling contact bearing means is effected in the slot in the carriage by threaded adjustment means.

13. A linear guide assembly for movably mounting a carriage in accordance with claim 12 wherein the parallel guide rails are polygonal shape.

14. A linear guide assembly for movably mounting a carriage in accordance with claim 12 wherein the parallel guide rails are arcuate in outer configuration in those portions which .contact the multiple extended linear rolling contact bearing means.

15. A linear guide assembly for movably mounting a carriage in accordance with claim 14 in which the multiple extended linear rolling contact bearing means are ball-bearing type rolling contact bearing means.

16. A linear guide assembly for movably mounting a carriage in accordance with claim 15 wherein the multiple extended linear rolling contact friction reducing means are circulating type ball-bearing means.

17. A linear-guide assembly for movably mounting a carriage in accordance with claim 16 wherein two rail support means are mounted adjacent to each other each with two parallel rails mounted on opposite sides and the carriage extends about both the rail support means with dual adjustable circulating-type ball bearing means housed in the side walls of the carriage and contacting each of the rails.

\* \* \* \* \*